(12) United States Patent
Zhelev

(10) Patent No.: US 7,925,885 B2
(45) Date of Patent: Apr. 12, 2011

(54) METHOD FOR RECORDING AND READING A CODE OF MATERIAL PRODUCTS FOR PROTECTION AND CONTROL OF THEIR AUTHENTICITY, AND A SYSTEM THEREFOR

(75) Inventor: Zhivko Georgiev Zhelev, Sofia (BG)

(73) Assignee: Keit Ltd., Sofia (BG)

( * ) Notice: Subject to any disclaimer, the term of this patent is extended or adjusted under 35 U.S.C. 154(b) by 0 days.

(21) Appl. No.: 10/491,809

(22) PCT Filed: Oct. 3, 2002

(86) PCT No.: PCT/BG02/00026
§ 371 (c)(1),
(2), (4) Date: Nov. 4, 2004

(87) PCT Pub. No.: WO03/030098
PCT Pub. Date: Apr. 10, 2003

(65) Prior Publication Data
US 2005/0086490 A1 Apr. 21, 2005

(30) Foreign Application Priority Data
Oct. 4, 2001 (BG) ........................................ 105975

(51) Int. Cl.
*H04L 9/00* (2006.01)

(52) U.S. Cl. ........ 713/179; 713/176; 382/116; 382/119; 380/204; 380/200

(58) Field of Classification Search .................. 713/176, 713/179
See application file for complete search history.

(56) References Cited

U.S. PATENT DOCUMENTS

| | | | | |
|---|---|---|---|---|
| 5,719,939 A | * | 2/1998 | Tel ................................. | 713/179 |
| 5,748,780 A | * | 5/1998 | Stolfo ........................... | 382/232 |
| 5,987,136 A | * | 11/1999 | Schipper et al. .............. | 713/176 |
| 6,748,533 B1 | * | 6/2004 | Wu et al. ....................... | 713/176 |
| 6,788,800 B1 | * | 9/2004 | Carr et al. ..................... | 382/100 |
| 6,845,913 B2 | * | 1/2005 | Madding et al. .......... | 235/462.13 |
| 7,028,188 B1 | * | 4/2006 | Moore ........................... | 713/176 |

FOREIGN PATENT DOCUMENTS
WO 99/53428 10/1999
* cited by examiner

*Primary Examiner* — Nasser Moazzami
*Assistant Examiner* — Fikremariam Yalew
(74) *Attorney, Agent, or Firm* — Ladas & Parry LLP

(57) ABSTRACT

Material code recording and reading method and devices designed for protection of products and control of their authenticity. The marking device 1 embeds a sign upon the product 4, the marked product 5 is passed to camera 2 which films the product material structure around the sign and transfers the image to the recording device 3, the latter records the database. The comparing alarm device 8 compares the icon from camera 7 with the icon from database 6 and alarms whether they are identical or not.

4 Claims, 1 Drawing Sheet

METHOD FOR RECORDING AND READING A CODE OF MATERIAL PRODUCTS FOR PROTECTION AND CONTROL OF THEIR AUTHENTICITY, AND A SYSTEM THEREFOR

FIELD OF THE INVENTION

The invention concerns a material code recording and reading method and devices designed for protection of products and control of their authenticity applicable in the production process and control of money, documents, securities and articles if there is any suspicion about their authenticity.

DESCRIPTION OF THE RELATED ART

Recording and control methods and devices intended for marking protection of securities and products against counterfeit by means of watermark, inks visible in ultraviolet or other light source; micro barcodes, metal thread with one-grade cipher, micro kinegrams, banderols, laser markings etc. are known. The control is made through comparison with naked or equipped eye.

U.S. Pat. No. 5,719,939 relates to a method and system for verifying the legitimacy of a product against forgery by depositing a plurality of overlying fibers over the surface, optically scanning, recording into a database, and subsequent verification of the product. The common disadvantage of the known methods and devices is that they do not suggest a method to distinguish the original from its exact copy.

SUMMARY OF THE INVENTION

The goal of the invention is to create material code recording and reading method and devices for protection of products and control of their authenticity. This invention is intended to achieve unique protection aiming at differentiation of the original from its exact copy. In fact the material code recording and reading method and the devices designed for protection of products and control of their authenticity are the solution of the problem. The marking device embeds a sign upon the product, afterwards the marked product is passed to a camera to film the product structure around the sign and the image is transferred to the recording device. The latter records the database. The comparing alarm device reads the marking whereupon compares the picture from the camera with the icon from the database and alarms whether they coincide or not.

BRIEF DESCRIPTION OF THE DRAWINGS

The invention is accompanied by explanations.

DETAILED DESCRIPTION OF THE PREFERRED EMBODIMENTS

Figure 1:
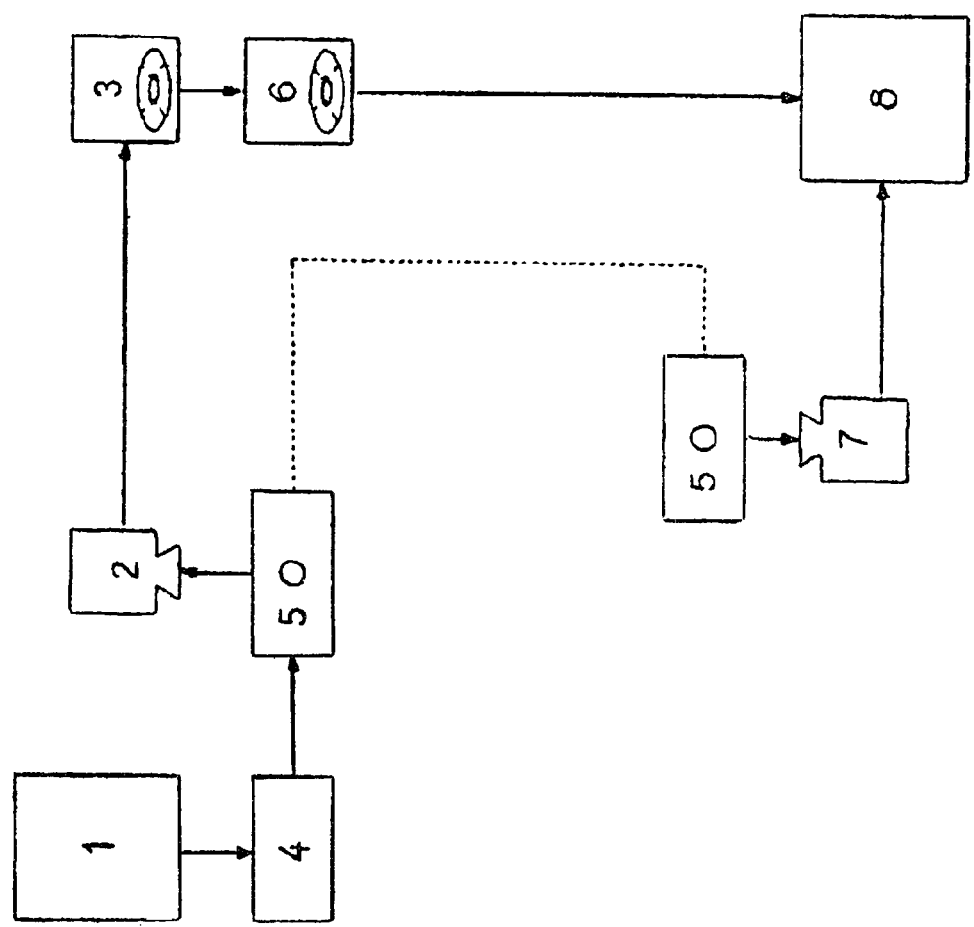
FIG. 1 is a block diagram of a system according to an example embodiment of the present invention.

As noted above, FIG. 1 shows a system according to an example embodiment of the present invention. FIG. 1 includes the following elements:
1. Marking Device (Printer, Laser, Punching Machine etc.)
2. Camera
3. Recording Device (CD-R, DVD-R etc.)
4. Product (Documents, Tickets, other articles etc.)
5. Marked Product
6. Database (CD-ROM, DVD etc.)
7. Camera
8. Comparing Alarm Device With the marking device (Printer, Laser, Punching Machine etc.) a sign is embedded on the product whereupon the marked product is transferred to the camera which films a part or the whole structure of the product material around the sign. Next the image of the structure is moved to a recording device in order to record the database of the structure image, number and name of the product. The comparing alarm device and the camera allow the reading of the marking from each point of the world. Both images from the camera and the database are compared by the comparing alarm device. which alarms whether the icons are identical or not.

Referring again to FIG. 1, a system is shown for recording and reading a structure of the original material of products for protection and control of their authenticity. The marking device (1) embeds a sign upon the original product (4). The camera (2) films the product material structure around the embedded sign of the original product (5). The recording device (3) records the filmed image in a database (6). The camera (7) films the product material structure around the embedded sign of the original product (5). The comparing and alarm device (8) compares an image from the camera (7) with the image from the database (6) and alarms whether they coincide or not. The comparing and alarm device (8) differentiates the original product from exact copies thereof by a unique structure of the original material of the product around the sign embedded upon the original product, which is a code of material of the product. The sign serves as a reference point of which part of the original material is to be scanned for authentication purposes, wherein a part or a whole of the product material structure around the embedded sign is filmed and used for authentication. The sign may be embedded by means of a printer, a laser, a punching machine, etc.

The present invention also discloses a method for recording and reading a structure of the original material of products for protection and control of their authenticity. The method includes embedding a sign upon the original product, passing the original product to a camera to film the product material structure around the sign, recording the filmed image in a database. The method also includes comparing the image recorded in the database with another image from another camera, and differentiating the original product from exact copies thereof by a unique structure of the original material of the product around the sign embedded upon the original product, which is a code of material of the product. The sign serves as a reference point of which part of the original material is to be scanned for authentication purposes, wherein a part or a whole of the product material structure around the embedded sign is filmed and used for authentication. The sign may be embedded by means of a printer, a laser, a punching machine, etc.

The invention claimed is:
1. A method for recording and reading a structure of the original material of products for protection and control of their authenticity, comprising:
   embedding a sign upon the original product,
   passing the original product to a camera to film the product material structure around the sign,
   recording the filmed image in a database,
   comparing the image recorded in the database with another image from another camera, and
   differentiating the original product from exact copies thereof by a unique structure of the original material of the product around the sign embedded upon the original product, which is a code of material of the product, wherein the sign serves as a reference point of which part of the original material is to be scanned for authentication purposes, wherein a part or a whole of the product material structure around the embedded sign is filmed and used for authentication.

2. The method according to claim 1, wherein the sign is embedded by means of a printer, a laser, or a punching machine.

3. A system for recording and reading a structure of the original material of products for protection and control of their authenticity, comprising:
- a marking device (1) to embed a sign upon the original product (4);
- a camera (2) to film the product material structure around the embedded sign of the original product (5);
- a recording device (3) to record the filmed image in a database (6);
- the database (6);
- a camera (7) to film the product material structure around the embedded sign of the original product (5); and
- a comparing and alarm device (8) to compare an image from the camera (7) with the image from the database (6) and alarm whether they coincide or not, wherein the comparing and alarm device (8) differentiates the original product from exact copies thereof by a unique structure of the original material of the product around the sign embedded upon the original product, which is a code of material of the product, wherein the sign serves as a reference point of which part of the original material is to be scanned for authentication purposes, wherein a part or a whole of the product material structure around the embedded sign is filmed and used for authentication.

4. The system according to claim 3, wherein the sign is embedded by means of a printer, a laser, or a punching machine.

\* \* \* \* \*